Jan. 6, 1931.  C. J. WIEBUSCH  1,788,262
CAN DRAINING RACK
Filed Dec. 9, 1929

CLARENCE J. WIEBUSCH
INVENTOR

BY Victor J. Evans
ATTORNEY

WITNESS Lee Smith

Patented Jan. 6, 1931

1,788,262

UNITED STATES PATENT OFFICE

CLARENCE JOHN WIEBUSCH, OF LAKE CITY, MINNESOTA

CAN-DRAINING RACK

Application filed December 9, 1929. Serial No. 412,849.

This invention relates to certain new and useful improvements in supports primarily designed for the maintaining of receptacles in draining position.

Another object of the invention embodies a foot portion designed for locking connection with the form of support incident to the weight of the receptacle thereagainst.

Another object of the invention consists of a connecting element for the support to apply same about the filling opening of a reservoir being filled.

With the above and other objects in view, the invention further consists of the following novel features and details of construction, to be hereinafter more fully described, illustrated in the accompanying drawing and pointed out in the appended claims.

In the drawing:—

Figures 1, 2:
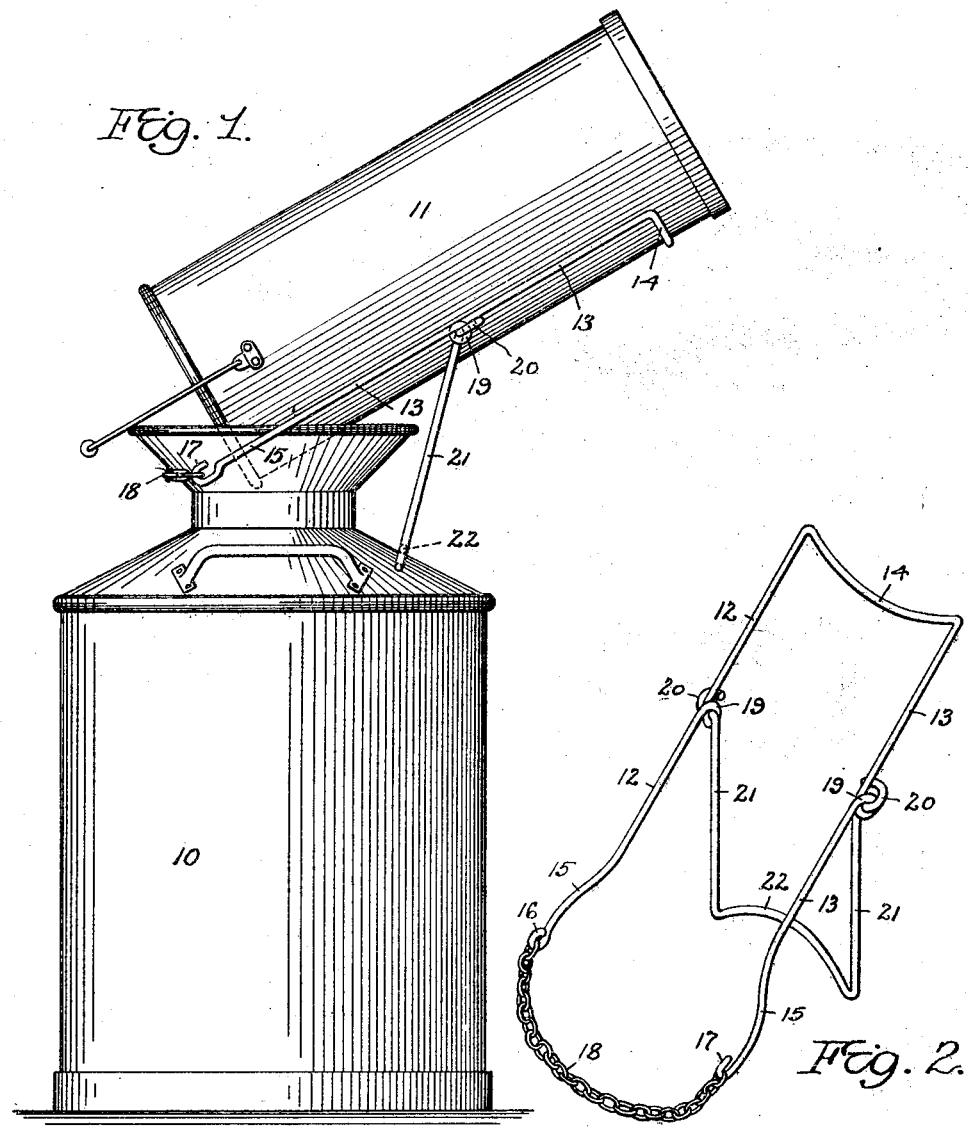
Figure 1 is a side elevation of the invention as applied and in use.
Figure 2 is a perspective view of the invention per se.

Referring to the drawing in detail wherein like characters of reference denote corresponding parts, the reference character 10 indicates generally a reservoir or can having the neck and filling opening therefor constructed after the manner of the conventional form of milk can used for the transportation of milk from rural districts to pasteurizing plants.

It is my purpose to arrange a form of support upon the outwardly flared filling neck of these forms of cans or reservoirs by means of which the smaller collecting buckets or pails, such as indicated at 11, may be supported in the Figure 1 position while being emptied.

In carrying out my invention, I provide a form of support consisting of spaced parallel arm members 12 and 13 respectively joined at their outermost ends by a yoke portion 14 of arcuate-shape, of sufficient depth to support the pail 11 in the manner shown. The periphery of the pail adjacent the mouth thereof being projected within the flared filling opening in the reservoir and for this reason, it is necessary that the arms 12 and 13 should pass around the flared portion and to effect such disposition the ends of said arms are bent outwardly, as at 15. Closed and open hooks 16 and 17 are provided upon the extremities of the arms or legs 12 and 13 respectively to accommodate the end links of a chain 18. It is obviously apparent that the end link of the chain 18 having connection with the closed loop 16 is a permanent one and the remaining end link of the chain is detachably connected with the open hook or loop 17 to facilitate application of the device about the flared mouth or filling opening in the reservoir. The arms 12 and 13 are furthermore provided with loops 19 at appropriate points in the lengths thereof and oppositely disposed to facilitate accommodation of the U-shaped extremities 20 of leg members 21 upstanding from the extremities of a yoke portion 22 frictionally engaging the upwardly inclined reducer portion immediately beneath the flared filling neck of the reservoir.

The yoke portion 22 is constructed after the manner of but is disposed oppositely with respect to the yoke 14. The weight of the pail or bucket 11 against the arms 12 and 13 and reposing against the yoke 14 will be sufficient to cause the U-shaped extremities 20 of the leg members 21 to engage the under sides of the arm members 12 and 13 to restrict further tilting of the pail.

It is believed that this form of support will prove most effective for the purpose inasmuch as it will insure aligning of the ends of the reservoir and pail, to insure pouring of the milk within the filling neck and pay for itself many times over by the loss in milk ordinarily spilled while filling the cans or reservoirs.

The invention is susceptible of various changes in its form, proportions and minor details of construction, and the right is herein reserved to make such changes as properly fall within the scope of the appended claims.

Having described the invention, what is claimed is:—

1. A milk pail holder comprising spaced arm members extending in parallelism from an arcuate shaped pail receiving yoke, a connecting element carried upon the ends of the arm members detachably securing the support in position for use, and leg members swingably connected with the arm members.

2. A milk pail support comprising spaced arm members rightangularly disposed in spaced parallelism from the ends of a pail receiving yoke, a connecting element having detachable locking connection between the ends of the arm members to facilitate application of the support about the filling neck of a reservoir being filled, loops formed upon the arm members, leg members having U-shaped extremities passed through said loops and frictionally engaging the arm members, and a yoke portion establishing connection between the lowermost ends of the leg members.

In testimony whereof I affix my signature.

CLARENCE JOHN WIEBUSCH.